(12) United States Patent
Choi et al.

(10) Patent No.: US 9,496,540 B2
(45) Date of Patent: Nov. 15, 2016

(54) SECONDARY BATTERY HAVING ELECTRODE WITH SELF CUTTING PART TO BE DESTRUCTED ON APPLICATION OF OVER-CURRENT

(75) Inventors: Jea Hoon Choi, Daejeon (KR); Woojin Shin, Daejeon (KR); Jisang Yu, Daejeon (KR); Do Yang Jung, Daejeon (KR); Woo-Chul Yi, Daejeon (KR); John E. Namgoong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 930 days.

(21) Appl. No.: 12/299,289

(22) PCT Filed: Apr. 26, 2007

(86) PCT No.: PCT/KR2007/002035
§ 371 (c)(1),
(2), (4) Date: Mar. 26, 2009

(87) PCT Pub. No.: WO2007/126243
PCT Pub. Date: Nov. 8, 2007

(65) Prior Publication Data
US 2009/0305126 A1    Dec. 10, 2009

(30) Foreign Application Priority Data

May 1, 2006    (KR) .................. 10-2006-0039127

(51) Int. Cl.
*H01M 2/30* (2006.01)
*H01M 2/34* (2006.01)
*H01M 10/42* (2006.01)
(Continued)

(52) U.S. Cl.
CPC ................ *H01M 2/30* (2013.01); *H01M 2/34* (2013.01); *H01M 2/348* (2013.01); *H01M 10/4235* (2013.01); *H01M 2/0207* (2013.01); *H01M 10/052* (2013.01); *Y02T 10/7011* (2013.01)

(58) Field of Classification Search
CPC ........ H01M 2/30; H01M 2/34; H01M 2/348; H01M 10/4235
See application file for complete search history.

(56) References Cited

U.S. PATENT DOCUMENTS

2001/0038938 A1* 11/2001 Takahashi et al. ............. 429/53
2003/0215702 A1   11/2003 Tanjou et al.
(Continued)

FOREIGN PATENT DOCUMENTS

| | | |
|---|---|---|
| JP | 2002-141030 A | 5/2002 |
| JP | 2004-79542 A | 3/2004 |
| JP | 2004-119383 A | 4/2004 |

OTHER PUBLICATIONS

Denker, John; How to Define Anode and Cathode; 2004; http://www.av8n.com/physics/anode-cathode.htm#point-function-structure.*

*Primary Examiner* — Eugenia Wang
(74) *Attorney, Agent, or Firm* — Birch, Stewart, Kolasch & Birch, LLP (57) ABSTRACT

Disclosed herein is a plate-shaped secondary battery used as a unit cell for middle- or large-sized battery pack, the secondary battery having an electrode assembly, which can be charged and discharged, mounted in a sheet-shaped battery case including a metal layer and a resin layer in a sealed state, the electrode assembly having electrode terminals protruding outside a sealing part of the battery case, wherein at least one of the electrode terminals is provided at a position spaced a predetermined distance from the sealing part with a self cutting part having a vertical sectional area less than that of the remaining part of the at least one electrode terminal such that the self cutting part can break first when overcurrent flows in the secondary battery.

15 Claims, 9 Drawing Sheets

(51) Int. Cl.
*H01M 10/052* (2010.01)
*H01M 2/02* (2006.01)

(56) References Cited

U.S. PATENT DOCUMENTS

| | | |
|---|---|---|
| 2004/0038122 A1* | 2/2004 | Hisamitsu et al. ........... 429/120 |
| 2004/0038125 A1 | 2/2004 | Kim et al. |
| 2004/0115523 A1* | 6/2004 | Hommura et al. ........... 429/144 |
| 2004/0119442 A1 | 6/2004 | Lee et al. |
| 2004/0126650 A1* | 7/2004 | Kim ............................. 429/61 |
| 2005/0170243 A1* | 8/2005 | Ozawa et al. ................ 429/162 |
| 2005/0186472 A1* | 8/2005 | Kameyama et al. ......... 429/176 |
| 2006/0063066 A1* | 3/2006 | Choi et al. ................... 429/120 |

* cited by examiner

FIG. 1

Prior Art

(1) 0.8 seconds after short
(2) 1.0 second after short
(3) 1.3 seconds after short
(4) 2.4 seconds after short

Fig. 10

(1) 0.8 seconds after short
(2) 1.0 second after short
(3) 1.3 seconds after short
(4) 2.4 seconds after short

Fig. 11

(1) 0.8 seconds after short

Fig. 12

(1) 0.8 seconds after short

SECONDARY BATTERY HAVING ELECTRODE WITH SELF CUTTING PART TO BE DESTRUCTED ON APPLICATION OF OVER-CURRENT

CROSS-REFERENCE TO RELATED APPLICATIONS

This application is the U.S. national stage of PCT International Application No. PCT/KR2007/002035 filed on Apr. 26, 2007, which claims priority to Korean Application No. 10-2006-0039127 filed in the Republic of Korea on May 1, 2006. The entire contents of all of the above are hereby incorporated by reference.

FIELD OF THE INVENTION

The present invention relates to a secondary battery for middle- or large-sized battery packs, and, more particularly, to a plate-shaped secondary battery used as a unit cell for middle- or large-sized battery packs, the secondary battery being constructed in a structure in which at least one of the electrode terminals is provided at a position spaced a predetermined distance from a sealing part of a battery case with a self cutting part that can break first when overcurrent flows in the secondary battery, thereby securing the safety of the secondary battery.

BACKGROUND OF THE INVENTION

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuel.

Small-sized mobile devices use one or several small-sized battery cells for each device. On the other hand, middle- or large-sized devices, such as vehicles, use a middle- or large-sized battery pack having a plurality of battery cells electrically connected with each other as unit cells because high output and large capacity are necessary for the middle- or large-sized devices.

Preferably, the middle- or large-sized battery pack is manufactured with small size and small weight if possible. For this reason, a prismatic battery or a pouch-shaped battery, which can be stacked with high integration and has a small weight to capacity ratio, is usually used as a battery cell of the middle- or large-sized battery pack. Especially, much interest is currently generated in the pouch-shaped battery because the weight of the pouch-shaped battery is small, the pouch-shaped battery has a low possibility of electrolyte leakage, and the manufacturing costs of the pouch-shaped battery are low.

Figure 1:
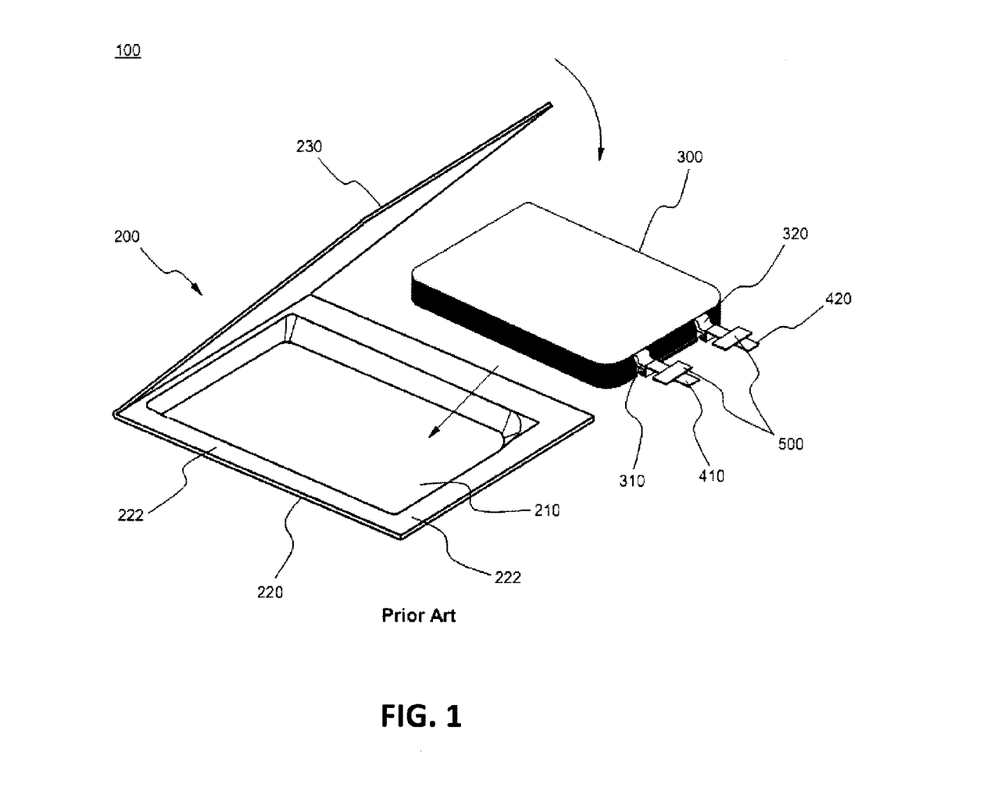
FIG. 1 is a typical view illustrating a conventional representative pouch-shaped lithium ion polymer secondary battery for middle- or large-sized battery packs.

FIG. 1 is a typical view illustrating a process of manufacturing a conventional representative lithium ion polymer secondary battery (hereinafter, often referred to as a pouch-shaped battery) used to manufacture middle- or large-sized battery packs.

Referring to FIG. 1, the pouch-shaped battery 100 is manufactured by mounting an electrode assembly 300 having a cathode/separator/anode structure in a pouch-shaped battery case 200 made of a laminate sheet including polymer resin and aluminum and the sealing the battery case 200 while electrode leads 410 and 420 are exposed from the upper end of the battery case 200.

The battery case 200 included a lower case 220 having a receiving part 210 and an upper cover 230. The battery case 200 is constructed in a folding type structure in which the lower case 220 and the upper cover 230 are integrally connected with each other at the lower end of the battery case 200. After the electrode assembly 300 is located in the receiving part 210, the upper end and side edges 222 of the lower case 220 are bonded to corresponding parts of the upper cover 230 such that the battery case 200 is sealed. Consequently, the upper end and side edges 222 of the battery case 200 form sealing parts after the battery is assembled.

To the electrode leads 410 and 420 are connected electrode taps 310 and 320, which protrude from the electrode assembly 300. To the coupling regions between the battery case 200 and the electrode leads 410 and 420 are attached thin resin film-shaped sealing members 500 for preventing the leakage of an electrolyte, preventing the permeation of moisture contained in the air into the battery, and securing the electrical insulation of the electrode leads 410 and 420.

Figure 2:
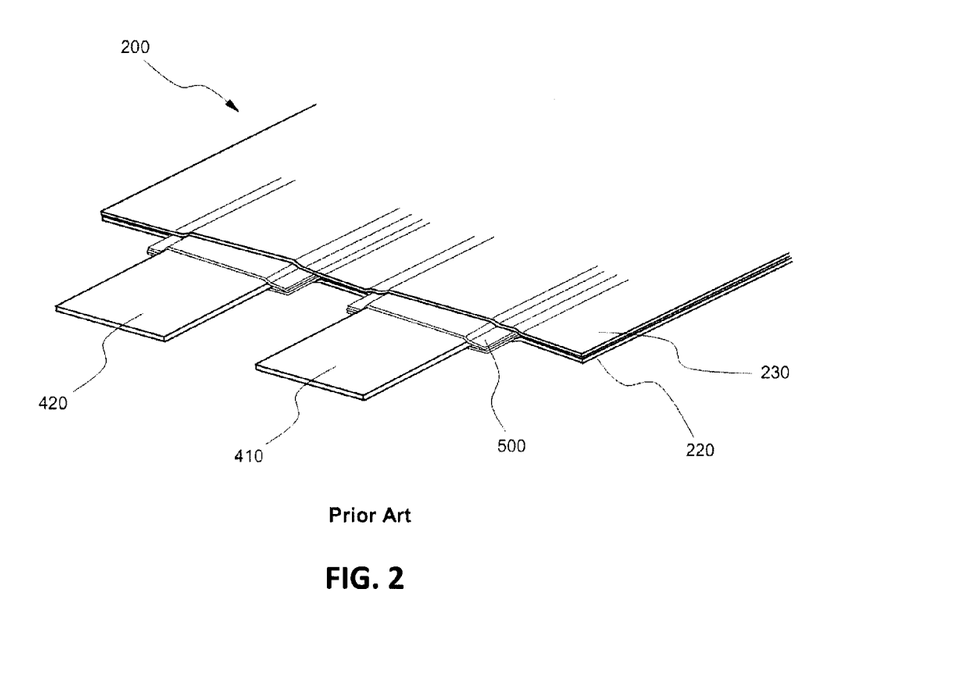
FIG. 2 is a partially enlarged view illustrating electrode terminal coupling parts of the pouch-shaped battery shown in FIG. 1.

FIG. 2 is a partially enlarged view illustrating the electrode terminal coupling parts of the pouch-shaped battery shown in FIG. 1.

Referring to FIG. 2, the cathode lead 410 and the anode lead 420, which are electrically connected with the electrode assembly constructed in the cathode/separator/anode structure (not shown), are sealed while the cathode lead 410 and the anode lead 420 are exposed from the upper end of the battery case 200, which is made of the aluminum laminate sheet. The sealing members 500 are interposed between the battery case 200 and the electrode leads 410 and 420, respectively. The bonding between the upper cover 230 and the lower case 220 of the battery case 200 is accomplished by attaching the upper cover 230 to the lower case 220 while applying heat and pressure to the upper cover 230 and the lower case 220. In the specification, the sealing parts indicate edges of the battery case 200 formed by the bonding between the upper cover 230 and the lower case 220. Corresponding regions of the sealing members 500 are included in the sealing parts.

A nickel-metal hydride secondary battery has been widely used as a unit cell (battery cell) for middle- or large-sized battery packs. Recently, however, much research has been carried out on lithium secondary batteries having a high output to capacity ratio in the same manner as small-sized battery packs, and some of the lithium secondary batteries are now commercially used. However, the lithium secondary battery has a problem in that the safety of the lithium secondary battery is fundamentally low. Especially, the pouch-shaped battery as shown in FIG. 1 is preferably used as a unit cell of middle- or large-sized battery packs due to the previously described various advantages; however, the pouch-shaped battery also has a problem in that the mechanical strength of the battery case is low, and, when the sealing parts are separated from each other, inflammable material, such as the electrolyte, may leak resulting in the occurrence of fire. The occurrence of fire is a very serious hazardous factor that reduces the safety of a middle- or large-sized battery pack having a plurality of unit cells electrically connected with each other to provide high output and large capacity.

One principal factor causing abnormal operation of the middle- or large-sized battery pack is a short circuit in the middle- or large-sized battery pack. For this reason, the middle- or large-sized battery pack includes various safety devices, such as fuses and protection circuits. These safety devices prevent the occurrence of a short circuit in the middle- or large-sized battery pack; however, when a high current flows instantaneously, for example, when foreign matter (especially, an electric conductor) is introduced into the middle- or large-sized battery pack with the result that a short circuit occurs in the middle- or large-sized battery pack, it is not possible to secure the safety of the middle- or large-sized battery pack.

SUMMARY OF THE INVENTION

Therefore, the present invention has been made to solve the above problems, and other technical problems that have yet to be resolved.

Specifically, it is an object of the present invention to provide a secondary battery constructed in a structure in which the safety of the secondary battery is secured when overcurrent flows in the secondary battery due to an external short circuit.

It is another object of the present invention to provide a middle- or large-sized battery pack including the secondary battery as a unit cell.

In accordance with one aspect of the present invention, the above and other objects can be accomplished by the provision of a plate-shaped secondary battery used as a unit cell for middle- or large-sized battery packs, the secondary battery having an electrode assembly, which can be charged and discharged, mounted in a sheet-shaped battery case including a metal layer and a resin layer in a sealed state, the electrode assembly having electrode terminals protruding outside a sealing part of the battery case, wherein at least one of the electrode terminals is provided at a position spaced a predetermined distance from the sealing part with a self cutting part having a vertical sectional area less than that of the remaining part of the electrode terminal such that the self cutting part can break first when overcurrent flows in the secondary battery.

In the secondary battery according to the present invention, the self cutting part of the electrode terminal breaks before heat generated from the overheated electrode terminal is transmitted to the sealing part of the battery case, such that the sealing part is separated, when overcurrent instantaneously flows in the secondary battery due to the abnormal operation of the middle- or large-sized battery pack. Consequently, the leakage of inflammable material, such as an electrolyte, is prevented, and the operation of the secondary battery is interrupted, whereby the safety of the secondary battery is secured. In addition, the electrode terminal of the secondary battery according to the present invention breaks even when overcurrent having a magnitude less than that of electric current at which the sealing part is separated flows in the secondary battery. Consequently, the safety of the secondary battery is secured.

As previously defined, the secondary battery according to the present invention is constructed generally in a plate-shaped structure, and therefore, a plurality of secondary batteries can be stacked one on another with high integration when a middle- or large-sized battery pack is manufactured using the secondary batteries. The plate-shaped structure has a large width and length to thickness ratio. Preferably, the plate-shaped structure is a rectangular or square structure.

The battery case is constructed in a sheet-shaped structure including a metal layer and a resin layer to prevent the permeation of moisture into the battery case, prevent the leakage of an electrolyte from the battery case, and provide sealability when the battery case is sealed. In a preferred embodiment, the battery case is made of a laminate sheet including a metal layer and a resin layer, and the battery case is constructed in a structure in which the electrode assembly is mounted in a one-unit sheet member having one or more surfaces integrally formed and the opening regions of the one-unit sheet member are bonded to each other such that the one-unit sheet member is sealed, or in a structure in which the electrode assembly is mounted between a completed separated two-unit sheet member and the contact regions of the edges of the two-unit sheet member are bonded to each other such that the two-unit sheet member is sealed. A representative example of laminate sheet may be an aluminum laminate sheet having resin layer formed at opposite major surfaces thereof. In a preferred embodiment, the secondary battery according to the present invention is a pouch-shaped secondary battery.

The electrode assembly is not particularly restricted so long as the electrode assembly includes cathodes and anodes that can be charged and discharged. For example, the electrode assembly may be constructed in a jelly-roll type or stacking type structure having a cathode/separator/anode arrangement. Preferably, the electrode assembly is a stacking type electrode assembly. In a preferred embodiment, the electrode assembly is used in a lithium ion battery or a lithium ion polymer battery using a lithium metal oxide as a cathode active material and a carbonaceous material as an anode active material. The lithium secondary battery has a problem in that the safety of the lithium secondary battery is low although the lithium secondary battery has excellent performance and advantages as previously described. However, it is possible to secure the safety of the lithium secondary battery by the construction according to the present invention.

In the plate-shaped secondary battery according to the present invention, the open edges of the battery case are bonded to each other, while the electrode assembly is mounted in the battery case, such that the battery case is sealed. The electrode terminals protrude outward from the sealing part of the battery case. The cathode terminal and the anode terminal may be located at the same side. Alternatively, the cathode terminal and the anode terminal may be located at different sides. The electrode terminals may be electrode taps protruding from the current collectors or electrode leads connected to the electrode taps. The electrode terminals are made of a conductive material. For example, the cathode terminal is made of an aluminum sheet, whereas the anode terminal is made of a copper sheet. The aluminum has a melting point less than that of the copper. In a preferred embodiment, therefore, the self cutting part is formed in the aluminum cathode terminal.

According to the present invention, the self cutting part is formed in the electrode terminal, while the self cutting part is spaced a predetermined distance from the sealing part of the battery case, such that the self cutting part breaks first when overcurrent flows in the secondary battery.

The self cutting part is a region having a sectional area less than that of the vertical sectional area of the remaining part of the corresponding electrode terminal. Resistance is inversely proportional to the sectional area of the electrode terminal. Consequently, the self cutting part is a region having relatively high resistance. The resistance of the self cutting part is negligible while the secondary battery is normally operated. However, when the secondary battery is abnormally operated, for example, when an external short circuit occurs due to overcurrent flowing in the secondary battery, a relatively large amount of heat is generated from the self cutting part with the result that the self cutting part automatically breaks upon the occurrence of overcurrent, whereby the electric conduction is interrupted. Consequently, the self cutting part serves as a safety element of the secondary battery. This principle will be described below in more detail.

Generally, the relationship between resistance, current, and heat generation amount is represented by Equation 1 below.

$$W = I^2 \times R \quad (1)$$

Where, W indicates heat generation amount, I indicates current, and R indicates resistance.

Also, the resistance is inversely proportional to the sectional area as represented by Equation 2 below.

$$R \propto 1/A \quad (2)$$

Where, A indicates the sectional area.

When overcurrent flows in the secondary battery, the heat generation amount of the electrode terminal suddenly increases as indicated by Equation 1 above. Especially, the heat generation amount of the electrode terminal suddenly increases at the region having the small sectional area as indicated by Equation 2 above. Consequently, the self cutting part of the electrode terminal easily breaks due to the large amount of heat generation and small heat capacity caused by the small sectional area.

Preferably, the self cutting part has a vertical sectional area equivalent to 30 to 90% of the vertical sectional area of the remaining part of the electrode terminal. When the vertical sectional area of the self cutting part is too small, power consumption during the normal operation of the secondary battery is greatly increased due to high resistance. When the vertical sectional area of the self cutting part is too large, on the other hand, it is difficult for the self cutting part to automatically break when overcurrent flows in the secondary battery. Consequently, it is not possible to accomplish a desired effect.

The length of the self cutting part is related to the resistance of the electrode terminal and the heat generation amount of the self cutting part necessary for the self cutting part to automatically break when overcurrent flows in the secondary battery. When the vertical sectional area of the self cutting part is small, the self cutting part is formed such that the self cutting part has a large length. When the vertical sectional area of the self cutting part is large, on the other hand, the self cutting part is formed such that the self cutting part has a small length. Consequently, the length of the self cutting part may be set within an appropriate range so as to prevent the loss of power during the normal operation of the secondary battery and in consideration of the condition of the heat generation amount necessary for the appropriate breakage of the self cutting part during the normal operation of the secondary battery.

The shape of the self cutting part is not particularly restricted so long as the shape of the self cutting part satisfies the above-mentioned conditions. For example, the self cutting part may be constructed in a structure in which the width of the electrode terminal is reduced, in a structure in which the thickness of the electrode terminal is reduced, or in a structure in which at least one through-hole is formed in the electrode terminal. According to circumstances, the self cutting part may be constructed in a combination of the above-mentioned two or more structures. Preferably, the self cutting part is constructed in a structure in which at least one through-hole is formed in the electrode terminal in consideration of the mechanical strength of the through-hole.

The self cutting part is constructed in a structure in which the width of the electrode terminal is reduced by forming a depression having various shapes in at least one side of the electrode terminal. For example, the depression may be formed in a round shape, a notch shape, or a square shape. However, the shape of the depression is not limited to the above-specified shapes. The experiment results according to the present invention revealed that notch-shaped depressions formed in the opposite sides of the corresponding electrode terminal were preferred.

The electrode terminal having the reduced thickness may be manufactured by rolling partially or entirely the width of the electrode terminal.

The electrode terminal having the through-hole formed therein may be manufactured by drilling at least one through-hole having various shapes in the middle or edge of the electrode terminal. The through-hole may be formed in a circular, elliptical, rectangular, or triangular shape. However, the shape of at least one through-hole is not limited to the above-specified shapes. The self cutting part may be formed in various manners depending upon the shape of the self cutting part. For example, the self cutting part may be formed by forging, rolling, or punching.

The number of self cutting parts formed in the electrode terminal is not particularly restricted. Two or more self cutting parts may be formed in the electrode terminal as needed.

As previously described, the self cutting part is formed at a position where the self cutting part is spaced a predetermined distance from the sealing part of the battery case. The distance is defined as a distance at which the self cutting part can break before heat generated from the self cutting part is transmitted to the sealing part of the battery case, such that the sealing part is separated, when the overcurrent flows in the secondary battery. Preferably, therefore, the self cutting part is spaced apart from the sealing part if possible. For example, the self cutting part may be formed at a position adjacent to a connecting member, such as a connecting member, which is connected to the electrode terminals of the secondary battery.

The overcurrent range in which the self cutting part breaks may be decided based on various factors related to the construction of the unit cells and the battery pack, such as the structure, size, number, and operating voltage of the unit cells. For example, normally 50 to 100 A of electric current flows and maximally 150 to 250 A of electric current flows at the normal operating condition of a middle- or large-sized battery pack used as a power source for electric vehicles and hybrid electric vehicles. The experiments carried out by the inventors of the present application revealed that the unit cell swelled when approximately 500 A of electric current was supplied to the unit cell of the battery pack. When approximately 1600 A of electric current was supplied to the unit cell, the sealing part of the battery case adjacent to the electrode terminal was partially separated. When approximately 1800 to 200 A of electric current was supplied to the secondary battery, and the leakage of an electrolyte occurred in the form of smoke along with the separation of the sealing part of the battery case, whereby the unit cell caught fire due to the overheating of the electrode terminal. The conduction of overcurrent may occur, for example, when the battery pack is short-circuited (external short circuit) due to foreign matter, such as an electric conductor. A process in which the unit cell of the battery pack catches fire due to the external short circuit will be described below in more detail.

When the external conductor is simultaneously brought into contact with the cathode terminal and the anode terminal of the battery pack resulting in the occurrence of a short circuit, overcurrent flows in the cathode terminal and the anode terminal. The magnitude of the overcurrent is decided based on various factors, such as the resistance of the conductor causing the short circuit and the internal resistance of the electrode terminals. The heat generation amount of the electrode terminals may be represented by Equation 3 below.

$$Q=CMT=Pt=IVt=I^2Rt \quad (3)$$

Where, Q indicates heat generation amount, C indicates specific heat, M indicates mass, T indicates temperature, and t indicates time.

When high overcurrent I flows in the electrode terminals, or relatively low overcurrent I flows in the electrode terminals for a long period of time t, the heat generation amount and the temperature are increased due to the resistance R of the electrode terminals.

When the increased temperature of the electrode terminals exceeds the melting point (150 to 200° C.) of the sealing part of the battery case, the sealing part of the battery case is melted with the result that the bonded regions of the battery case are separated from each other, and the electrolyte leaks from the battery case. The electrolyte may leak in the form of smoke. The leakage of the electrolyte is a cause of the catching fire of the unit cell. The catching fire of the unit cell normally occurs when the inflammable component, such as the electrolyte, is brought into contact with the overheated electrode terminals. However, the catching fire of the unit cell may easily occur due to other different causes in a state in which the condition of catching fire is formed. In addition to the catching fire of the unit cell, the electrode terminals break when the temperature of the electrode terminals reaches the melting point of the electrode terminal material (660° C. for aluminum).

When overcurrent flows in the unit cell, the electrode terminals of the unit cell is Joule heated with the result that the temperature of the electrode terminals instantaneously increases. The generated heat is transmitted to the sealing part of the battery case. Consequently, when the conduction time is short although the electrode terminals are overheated due to the conduction of the overcurrent, the heat is not sufficiently transmitted to the sealing part of the battery case. As a result, the separation of the sealing part does not occur. In the secondary battery according to the present invention, high heat is generated from the self cutting part of the electrode terminal, when overcurrent flows in the secondary battery, with the result that the self cutting part immediately breaks. Consequently, the continuous heat generation is restrained, and the sealing part of the battery case is not separated due to the heat generated for a short period of time. Also, the magnitude of the maximum current causing the breakage of the electrode terminal is decreased to the magnitude of current at which the separation of the sealing part is not caused, or at least the leakage of the inflammable component is not caused. As a result, it is possible to prevent the progress of the above-described firing mechanism.

According to the present invention, therefore, the magnitude of current causing the breakage of the self cutting part means the magnitude of current not to cause the separation of the sealing part or to cause at least the leakage of an inflammable component.

In accordance with another aspect of the present invention, there is provided a middle- or large-sized battery pack including one or more secondary batteries constructed as described above.

Generally, the middle- or large-sized battery pack is constructed by electrically connecting a plurality of unit cells, one of which is illustrated in FIG. 1. Since the unit cells are at least partially or entirely connected in series with each other to supply high-output, large-capacity electric energy, one or more unit cells among the unit cells connected in series with each other are the secondary batteries. In the structure in which the unit cells are connected in series with each other, the operation of the battery pack is interrupted when even some of the unit cells are short-circuited, whereby the safety of the battery pack according to the present invention is secured.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Now, preferred embodiments of the present invention will be described in detail with reference to the accompanying drawings. It should be noted, however, that the scope of the present invention is not limited by the illustrated embodiments.

Figure 3:
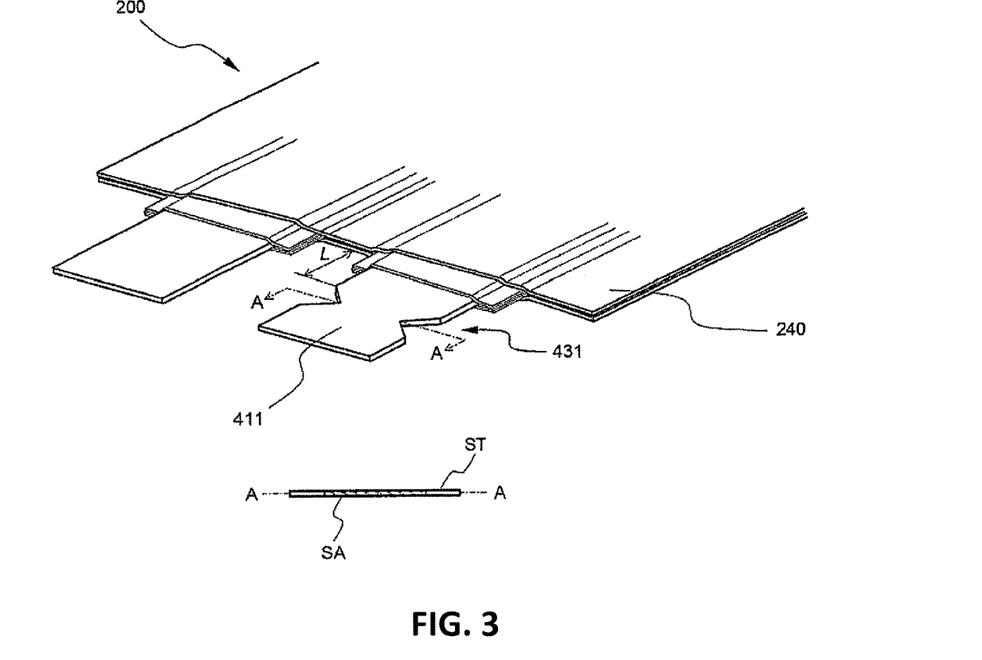
FIG. 3 is a partial perspective view illustrating a secondary battery constructed in which notch-shaped depressions, as a self cutting part, are formed in opposite sides of a cathode terminal according to a preferred embodiment of the present invention, including a vertical sectional view of the cathode terminal.

FIG. 3 is a partial perspective view illustrating a secondary battery constructed in which notch-shaped depressions, as a self cutting part, are formed in opposite sides of a cathode terminal according to a preferred embodiment of the present invention, including a vertical sectional view of the cathode terminal.

Referring to FIG. 3, the cathode terminal 411, which is made of aluminum, includes a self cutting part 431 constituted by notch-shaped depressions formed in opposite sides of the cathode terminal 411. Consequently, the vertical section area SA of the self cutting part 431 at the middle region A-A thereof is less than the vertical sectional area ST of the cathode terminal 411 at the remaining region thereof, whereby the self cutting part 431 of the cathode terminal 411 easily broke due to a large amount of heat generated when overcurrent flows in the secondary battery.

The self cutting part 431 is spaced a predetermined distance L from the sealing part 240 of the battery case 200. As a result, it takes a specific time until heat generated from the self cutting part 431 overheated due to the conduction of overcurrent is transmitted to the sealing part 501. Consequently, the distance L is defined as a distance at which the self cutting part 431 can break before the heat generated from the self cutting part 431 is transmitted to the sealing part 501.

Figure 4:
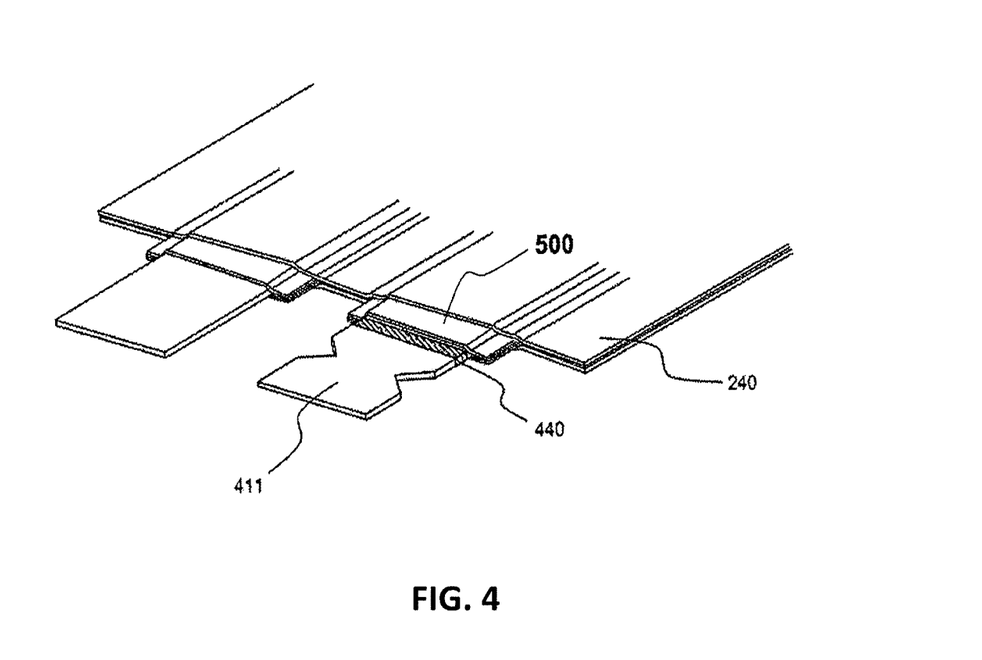
FIG. 4 is a typical view illustrating a modification of the secondary battery shown in FIG. 3, constructed in which an endothermic layer is formed on the cathode terminal adjacent to a sealing part of the secondary battery.

According to circumstances, an endothermic material, such as a phase change material (PCM), having high latent heat during the change of phase may be included in the sealing part 240. Alternatively, as shown in FIG. 4, an endothermic layer 440 may be formed on the cathode terminal 411 adjacent to the sealing part 240 for absorbing heat conducted from the self cutting part 431 to restrain the heat conduction to the sealing part 240.

Figure 5:
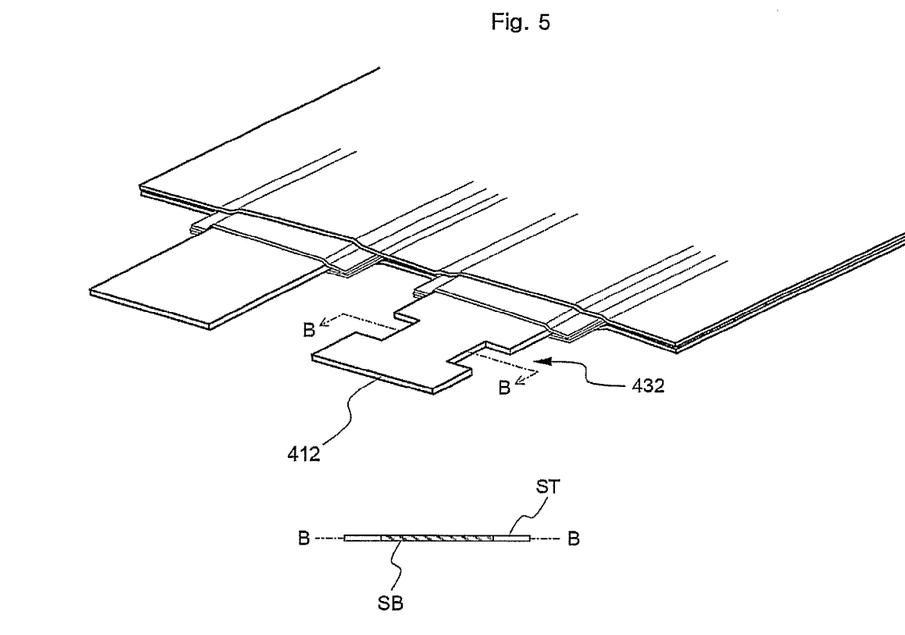
FIG. 5 is a partial perspective view illustrating a secondary battery constructed in which rectangular depressions, as a self cutting part, are formed in opposite sides of a cathode terminal according to another preferred embodiment of the present invention, including a vertical sectional view of the cathode terminal.

FIG. 5 is a partial perspective view typically illustrating a secondary battery constructed in which rectangular depressions, as a self cutting part, are formed in opposite sides of a cathode terminal according to another preferred embodiment of the present invention, including a vertical sectional view of the cathode terminal.

Referring to FIG. 5, the cathode terminal 412, which is made of aluminum, includes a self cutting part 432 constituted by rectangular depressions formed in opposite sides of the cathode terminal 412. Consequently, the vertical section area SB of the self cutting part 432 at the middle region B-B thereof is less than the vertical sectional area ST of the cathode terminal 412 at the remaining region thereof, whereby the self cutting part 432 of the cathode terminal 412 easily broke due to a large amount of heat generated when overcurrent flows in the secondary battery.

Figure 6:
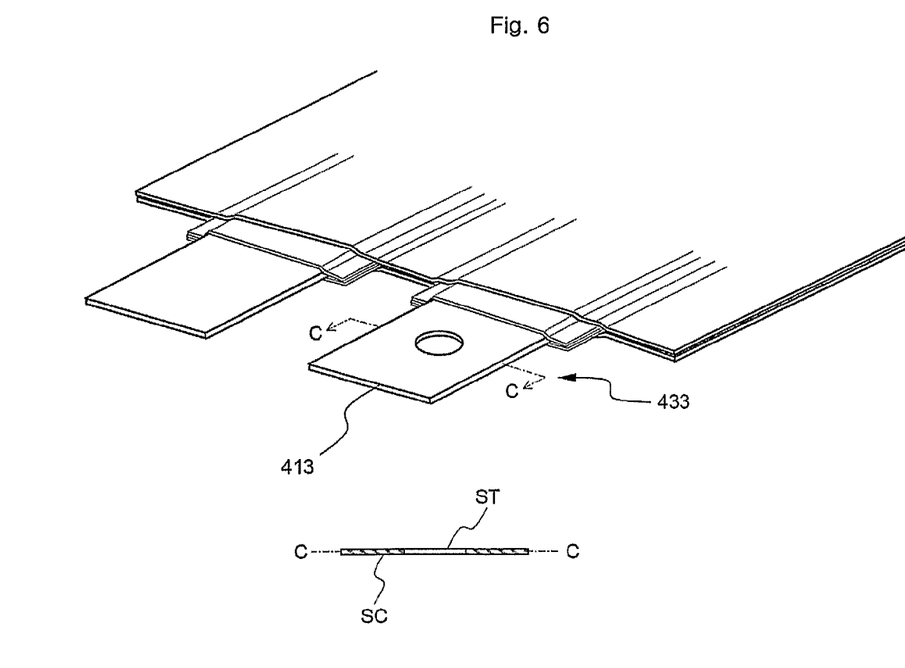
FIG. 6 is a partial perspective view illustrating a secondary battery constructed in which a through-hole, as a self cutting part, is formed in the middle region of a cathode terminal according to another preferred embodiment of the present invention, including a vertical sectional view of the cathode terminal.
Figure 7:
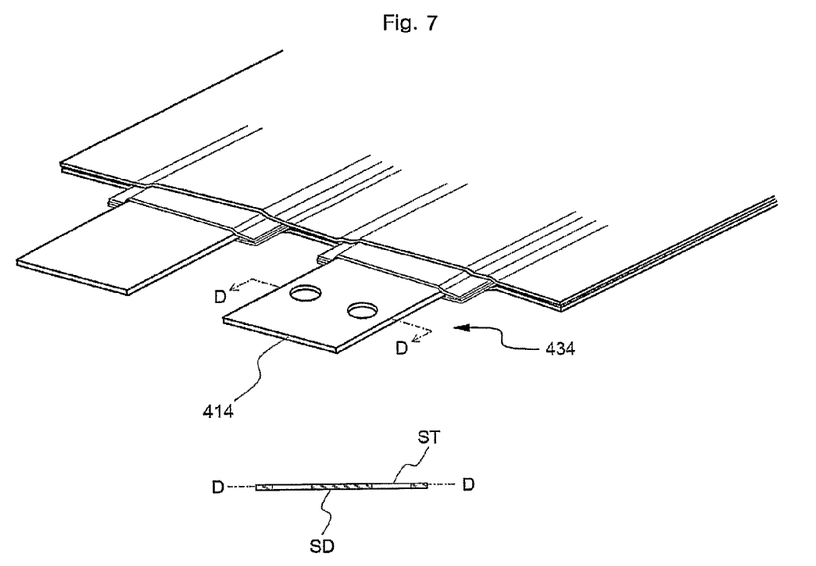
FIG. 7 is a partial perspective view illustrating a secondary battery constructed in which two through-holes, as a self cutting part, are formed in the middle region of a cathode terminal according to another preferred embodiment of the present invention, including a vertical sectional view of the cathode terminal.

FIG. 6 is a partial perspective view illustrating a secondary battery constructed in which a through-hole, as a self cutting part, is formed in the middle region of a cathode terminal according to another preferred embodiment of the present invention, including a vertical sectional view of the cathode terminal, and FIG. 7 is a partial perspective view illustrating a secondary battery constructed in which two through-holes, as a self cutting part, are formed in the middle region of a cathode terminal according to another preferred embodiment of the present invention, including a vertical sectional view of the cathode terminal.

Referring to these drawings, the vertical section area SC; SD of the self cutting part 433; 434 at the middle region C-C; D-D thereof is less than the vertical sectional area ST of the cathode terminal 413; 414 at the remaining region thereof, whereby the self cutting part 433; 434 of the cathode terminal 413; 414 easily broke due to a large amount of heat generated when overcurrent flows in the secondary battery.

Figure 8:
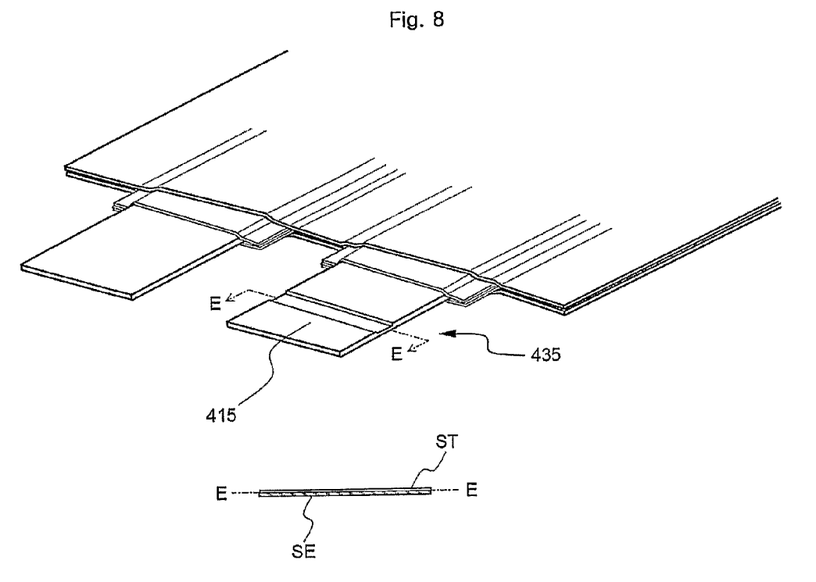
FIG. 8 is a partial perspective view illustrating a secondary battery constructed in which a groove, as a self cutting part, is formed in the middle region of a cathode terminal according to a further preferred embodiment of the present invention, including a vertical sectional view of the cathode terminal.

FIG. 8 is a partial perspective view typically illustrating a secondary battery constructed in which a groove, as a self cutting part, is formed in the middle region of a cathode terminal according to a further preferred embodiment of the present invention, including a vertical sectional view of the cathode terminal.

Referring to FIG. 8, the self cutting part 435 is formed by partially rolling the cathode terminal 415. The vertical section area SE of the self cutting part 435 at the middle region E-E thereof is less than the vertical sectional area ST of the cathode terminal 415 at the remaining region thereof, whereby the self cutting part 435 of the cathode terminal 415 also easily broke due to a large amount of heat generated when overcurrent flows in the secondary battery.

As can be seen from the above-described several illustrative structures, the self cutting part may have several shapes according to the present invention. In addition to the shapes of the self cutting part as shown in FIGS. 3 to 8, therefore, other different shapes of the self cutting part must be interpreted to be within the scope of the present invention so long as the effect of the present invention is accomplished by the shapes of the self cutting part.

Hereinafter, examples of the present invention will be described in more detail. It should be noted, however, that the scope of the present invention is not limited by the illustrated examples.

EXAMPLES

Comparative Example 1

A pouch-shaped secondary battery was prepared which was constructed approximately in a structure as shown in FIG. 1, and included an aluminum cathode tap and a copper anode tap. The size of the electrode taps exposed from a sealing part of a battery case was 4.5 cm in width and 0.02 cm in thickness. Power terminals of a power supply was connected to the end of the cathode tap and the end of the anode tap, and more than 500 A of electric current was supplied to the secondary battery so as to confirm the change of the secondary battery by the naked eye.

The experiment results revealed that the battery body swelled when approximately 500 A of electric current was supplied to the secondary battery. When approximately 1600 A of electric current was supplied to the secondary battery, the sealing part of the battery case was separated (vent) and the leakage (smoke) of an electrolyte occurred. When approximately 1800 A of electric current was supplied to the secondary battery, the sealing part of the battery case was completely separated. After approximately 0.9 seconds when approximately 2000 A of electric current was supplied to the secondary battery, the secondary battery caught fire. After approximately 1.2 seconds when approximately 2000 A of electric current was supplied to the secondary battery, the cathode tap of the secondary battery broke. Even after the breakage of the cathode tap, flames were maintained due to the electrolyte leaking from the separated sealing part of the secondary battery.

Figure 9:
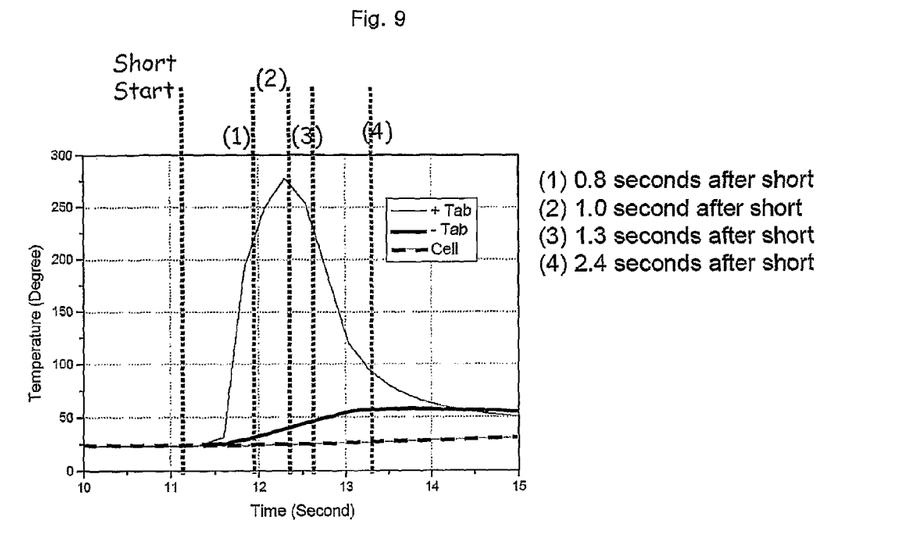
FIG. 9 is a graph illustrating the change in temperature of electrode taps and a battery when overcurrent is supplied to the battery according to Comparative example 1.
Figure 10:
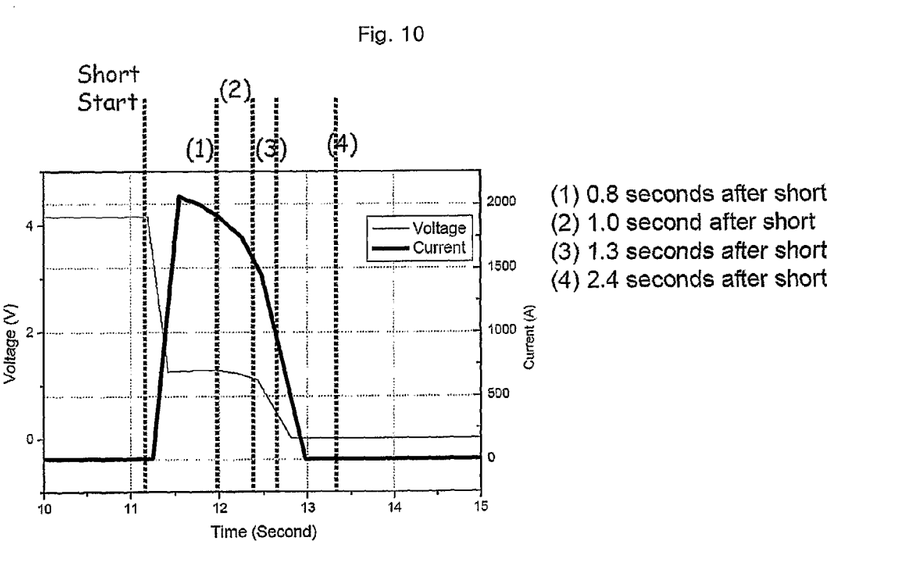
FIG. 10 is a graph illustrating the change in voltage and current of electrode taps and a battery when overcurrent is supplied to the battery according to Comparative example 1.

FIG. 9 is a graph illustrating the change in temperature of the electrode taps and the battery when overcurrent is supplied to the battery (short start), and FIG. 10 is a graph illustrating the change in voltage and current of the electrode taps and the battery when overcurrent is supplied to the battery.

Referring to these drawings, it was concluded that the separation of the sealing part of the battery case generated after the application of the overcurrent, i.e., due to the occurrence of an external short circuit was generated by heat generated from the electrode taps, not by the internal pressure of the secondary battery.

Example 1

Notches as shown in FIG. 3 were formed in opposite sides of the cathode tap of the pouch-shaped secondary battery prepared according to Comparative example 1. The notches were formed such that the center of the notches was spaced by 1.5 cm from the sealing part of the battery case and the notches had a width of 5 mm.

Figure 11:
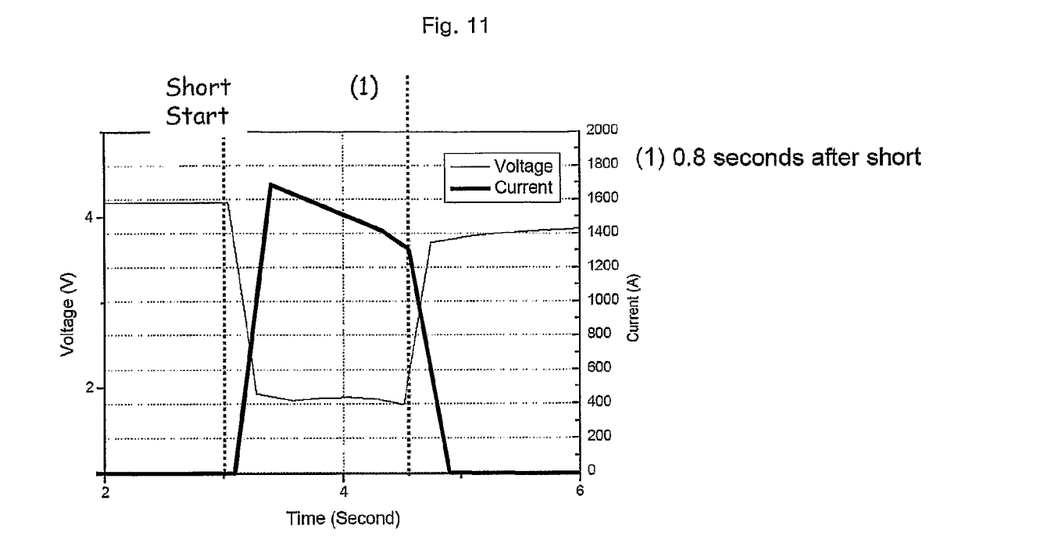
FIG. 11 is a graph illustrating the change in temperature of electrode taps and a battery when overcurrent is supplied to the battery according to Example 1.
Figure 12:
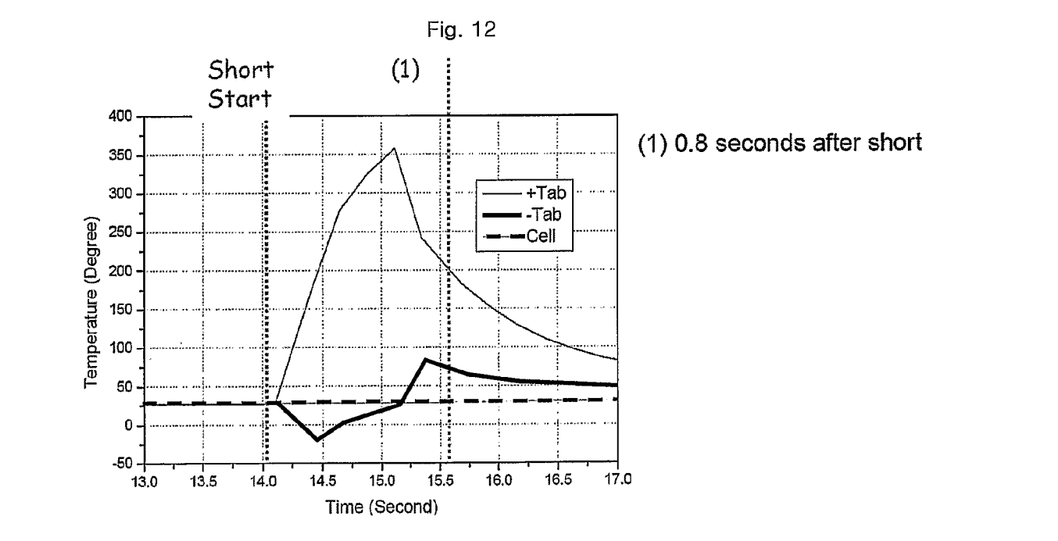
FIG. 12 is a graph illustrating the change in voltage and current of electrode taps and a battery when overcurrent is supplied to the battery according to Example 1.

The experiment results obtained after overcurrent was supplied to the secondary battery in the same manner as Comparative example 1 was shown in FIGS. 11 and 12.

Referring to these drawings together with the results of examination with the naked eye, the cathode tap of the secondary battery broke after approximately 0.8 seconds when approximately 1690 A of overcurrent was supplied to the secondary battery. However, the sealing part of the battery case was not separated, and the secondary battery did not catch fire.

Example 2

A through-hole as shown in FIG. 6 was formed in the cathode tap of the pouch-shaped secondary battery prepared according to Comparative example 1. The through-hole was formed in the middle region of the cathode tap such that the through-hole had a size corresponding to approximately 40% of the surface area of the cathode tap.

Figure 13:
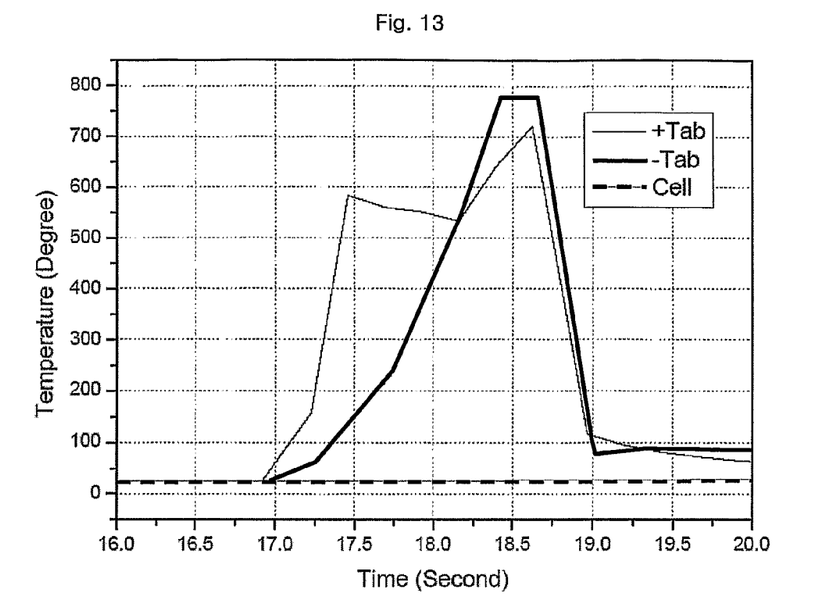
FIG. 13 is a graph illustrating the change in temperature of electrode taps and a battery when overcurrent is supplied to the battery according to Example 2.
Figure 14:
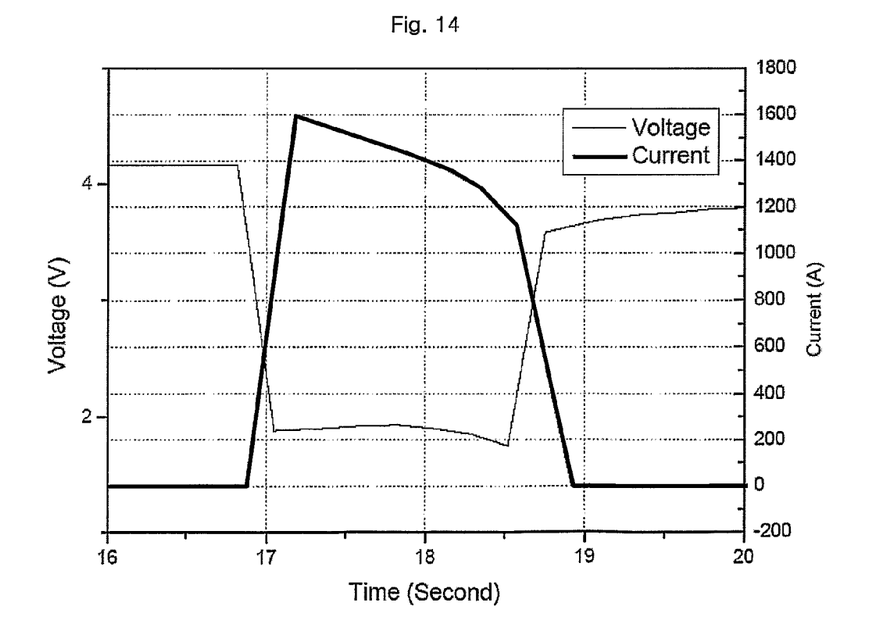
FIG. 14 is a graph illustrating the change in voltage and current of electrode taps and a battery when overcurrent is supplied to the battery according to Example 2.

The experiment results obtained after overcurrent was supplied to the secondary battery in the same manner as Comparative example 1 was shown in FIGS. 13 and 14.

Referring to these drawings together with the results of examination with the naked eye, the cathode tap of the secondary battery broke after approximately 1.6 seconds when approximately 1600 A of overcurrent was supplied to the secondary battery. The sealing part of the battery case was slightly separated; however, the secondary battery did not catch fire.

Example 3

Two through-holes as shown in FIG. 7 were formed in the cathode tap of the pouch-shaped secondary battery prepared according to Comparative example 1. The through-holes were formed in the middle region of the cathode tap such that each through-hole had a size corresponding to approximately 25% of the surface area of the cathode tap. Also, the through-holes were arranged such that the through-holes were spaced approximately 2 mm from each other.

Figure 15:
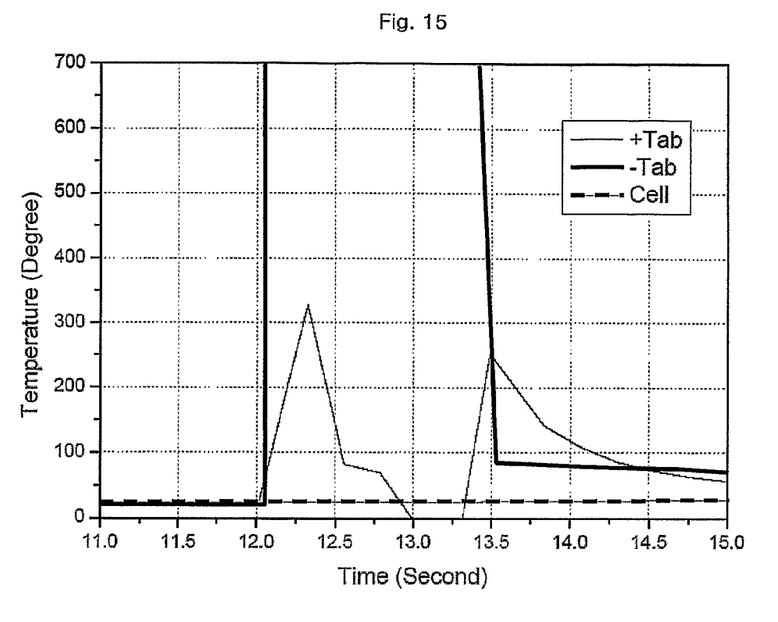
FIG. 15 is a graph illustrating the change in temperature of electrode taps and a battery when overcurrent is supplied to the battery according to Example 3.
Figure 16:
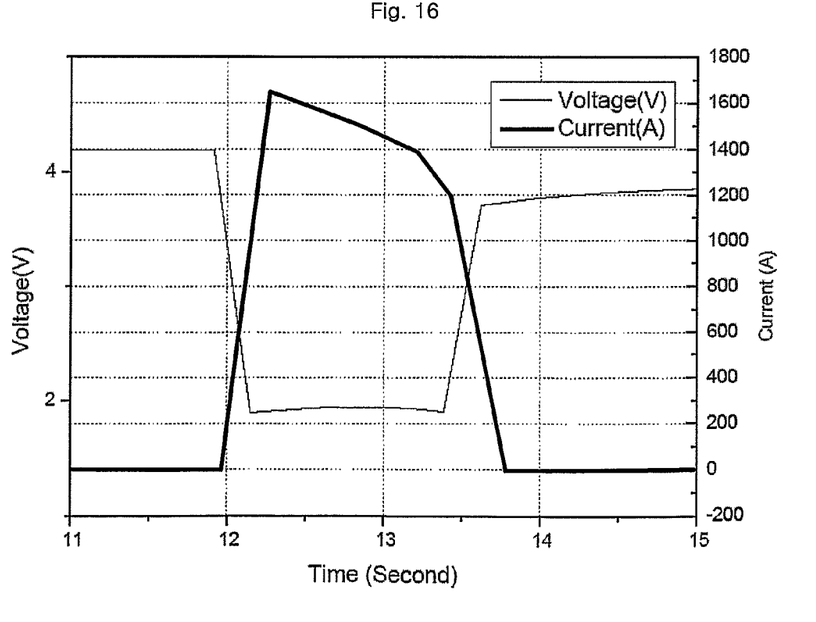
FIG. 16 is a graph illustrating the change in voltage and current of electrode taps and a battery when overcurrent is supplied to the battery according to Example 3.

The experiment results obtained after overcurrent was supplied to the secondary battery in the same manner as Comparative example 1 was shown in FIGS. 15 and 16.

Referring to these drawings together with the results of examination with the naked eye, the cathode tap of the secondary battery broke after approximately 1.0 second when approximately 1600 A of overcurrent was supplied to the secondary battery. However, the sealing part of the battery case was not separated, and the secondary battery did not catch fire.

As can be seen from the results of Example 2 and Example 3, a possibility of the sealing part to be separated increases as the breakage time of the cathode tap increases. However, it can be seen that the secondary battery does not catch fire by virtue of the self cutting part according to the present invention.

As apparent from the above description, the secondary battery for middle- or large-sized battery packs according to the present invention is constructed in a structure in which the electrode terminals of the secondary battery break before the sealing part of the battery case is separated and an inflammable component, such as the electrolyte, leaks from the battery case when overcurrent flows in the secondary battery due to an external short circuit. Consequently, the present invention has the effect of securing the safety of the secondary battery.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:
1. A plate-shaped secondary battery for middle- or large-sized battery pack, the secondary battery, comprising:
    a sheet-shaped battery case having a sealing part and including a metal layer and a resin layer; and
    an electrode assembly, which can be charged and discharged, the electrode assembly mounted with an electrolyte in the sheet-shaped battery case in a sealed state, and having electrode terminals, the electrode terminals including a cathode terminal having an exposed portion protruding outside the sealing part of the battery case,
    wherein at least one of the electrode terminals is provided at a position spaced a predetermined distance from the sealing part with a self cutting part having a vertical sectional area less than a vertical sectional area of a remaining part of the at least one electrode terminal such that the self cutting part can break first when overcurrent flows in electrode assembly, and the self cutting part is located outside the battery case such that the battery case and sealing part are located between the self cutting part and the electrode assembly, wherein the self cutting part is formed in the cathode terminal, wherein thin resin film-shaped sealing members are attached to coupling regions between the battery case and the electrode terminals, wherein an endothermic layer having high latent heat during a change of phase is formed only on the exposed portion of the cathode terminal between the sealing part and the self cutting part, wherein the predetermined distance is defined as a distance at which the self cutting part can break before heat generated from the self cutting part is transmitted to the sealing part of the battery case, such that the sealing part is separated, when the overcurrent flows in the electrode assembly, and wherein the battery case is made of a laminate sheet including the metal layer and the resin layer.

2. The secondary battery according to claim 1, wherein the battery case is constructed in a structure in which the electrode assembly is mounted in a one-unit sheet member having one or more surfaces integrally formed and opening regions of the one-unit sheet member are bonded to each other such that the one-unit sheet member is sealed.

3. The secondary battery according to claim 1, wherein the secondary battery is a pouch-shaped battery.

4. The secondary battery according to claim 1, wherein the secondary battery is a lithium ion battery or a lithium polymer battery.

5. The secondary battery according to claim 1, wherein the vertical sectional area of the self cutting part is equivalent to 30 to 90% of the vertical sectional area of the remaining part of the at least one electrode terminal.

6. The secondary battery according to claim 1, wherein the self cutting part is selected from the group consisting of a first structure in which a width of the at least one electrode terminal is reduced, a second structure in which a thickness of the at least one electrode terminal is reduced, a third structure in which at least one through-hole is formed in the at least one electrode terminal, and combinations thereof.

7. The secondary battery according to claim 6, wherein the self cutting part is constructed in the third structure in which at least one through-hole is formed in the at least one electrode terminal.

8. The secondary battery according to claim 6, wherein the self cutting part is constructed in the first structure in which the width of the at least one electrode terminal is reduced by forming a depression in at least one side of the at least one electrode terminal.

9. The secondary battery according to claim 8, wherein the depression is a notch-shaped depression.

10. A middle- or large-sized battery pack including a plurality of secondary batteries, wherein each secondary battery is the secondary battery according to claim 1.

11. The battery pack according to claim 10, wherein the plurality of the secondary batteries are at least partially or entirely connected in series with each other.

12. The secondary battery according to claim 1, wherein the battery case is constructed in a structure in which the electrode assembly is mounted between a completed separated two-unit sheet member and contact regions of edges of the two-unit sheet member are bonded to each other such that the two-unit sheet member is sealed.

13. The secondary battery according to claim 1, wherein an anode terminal is made from a material having a higher melting point than the cathode terminal.

14. The secondary battery according to claim 13, wherein the anode terminal is made from copper.

15. The secondary battery according to claim 1, wherein the sealing members protrude outwardly from the battery case, and wherein the endothermic layer contacts the sealing member of the cathode terminal.

* * * * *